US007003183B1

(12) United States Patent
Phua et al.

(10) Patent No.: US 7,003,183 B1
(45) Date of Patent: Feb. 21, 2006

(54) INDEPENDENTLY VARIABLE FIRST AND SECOND ORDER POLARIZATION MODE DISPERSION COMPENSATOR

(75) Inventors: Poh-Boon Phua, Singapore (SG); Hermann A. Haus, deceased, late of Lexington, MA (US); by Eleanor L. Haus, legal representative, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 201 days.

(21) Appl. No.: 10/664,135

(22) Filed: Sep. 17, 2003

Related U.S. Application Data

(60) Provisional application No. 60/413,964, filed on Sep. 26, 2002, provisional application No. 60/413,801, filed on Sep. 26, 2002.

(51) Int. Cl.
*G02B 6/27* (2006.01)
(52) U.S. Cl. .............................. 385/11; 385/27; 359/499
(58) Field of Classification Search .................. 385/11, 385/27; 359/483, 497, 499

See application file for complete search history.

(56) References Cited

U.S. PATENT DOCUMENTS

| 2002/0118455 A1 | 8/2002 | Damask |
| 2003/0072513 A1 * | 4/2003 | Glingener et al. ............ 385/11 |
| 2003/0223056 A1 * | 12/2003 | Fu et al. .................... 356/73.1 |

OTHER PUBLICATIONS

Yan, L.S. et al., "Fast Digitally Variable Differential Group Delay Module Using Polarization Switching", Optical Society of America, pp FA5-1-FA5-2, 2002.

* cited by examiner

*Primary Examiner*—Sarah Song
(74) *Attorney, Agent, or Firm*—Brenda Pomerance

(57) ABSTRACT

A PMD compensator or generator includes one module for adjusting first order PMD without altering second order PMD (FOnSO module), and another module for adjusting second order PMD without altering first order PMD (SOnFO module). The modules enable separate compensation of first and second order PMD. First order PMD can be measured and compensated in a feedforward manner, while second order PMD can be compensated in a feedback manner. Both first and second order PMD can be compensated in a feedforward manner. The modules also enable separate generation of first and second order PMD, and can be used in a completely deterministic manner to achieve the desired PMD.

32 Claims, 10 Drawing Sheets

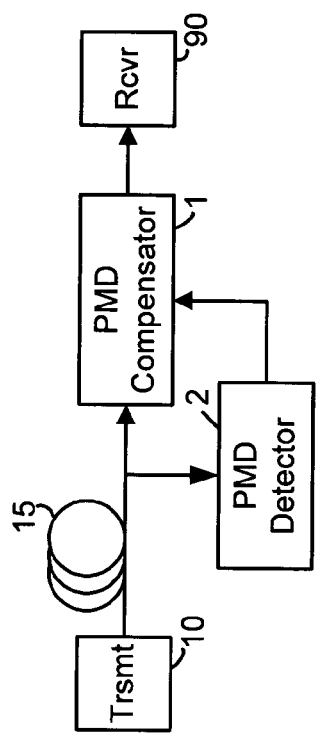
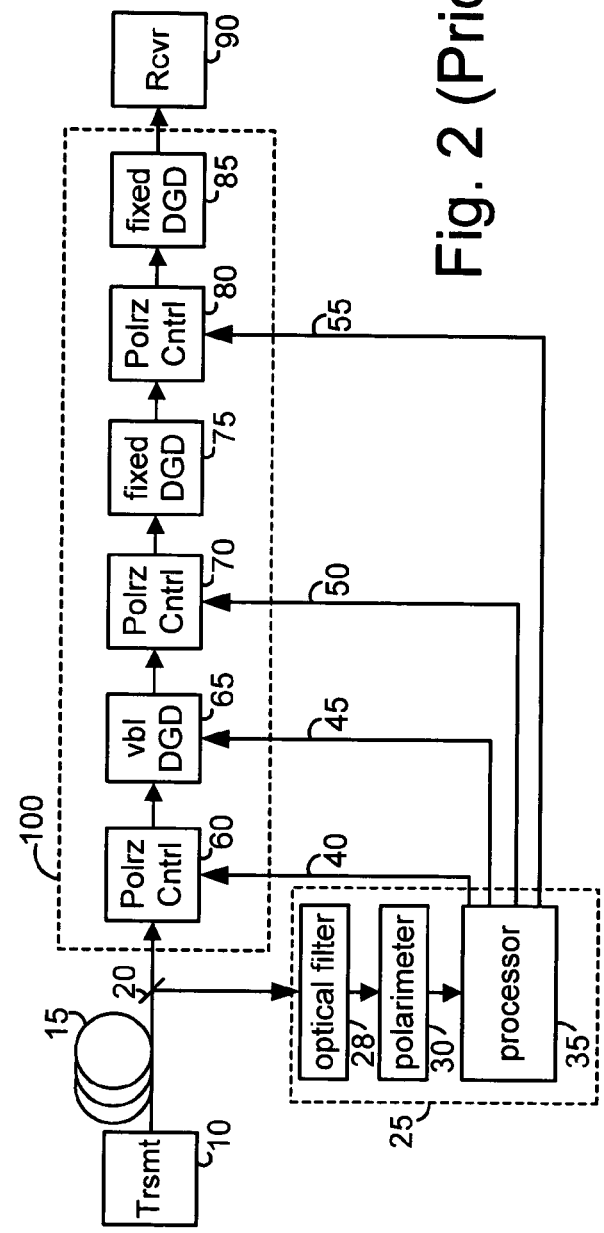

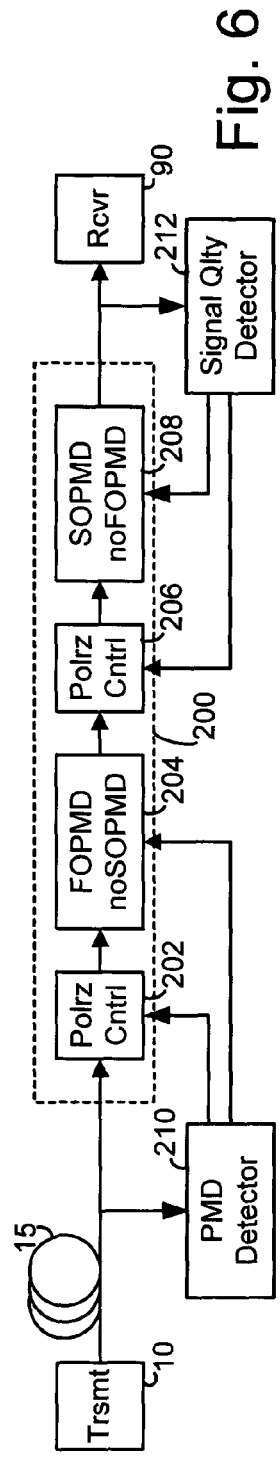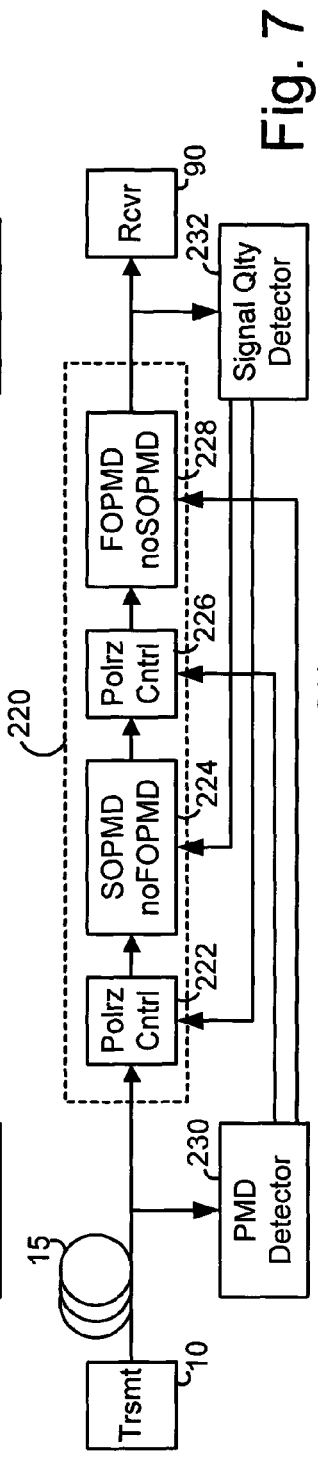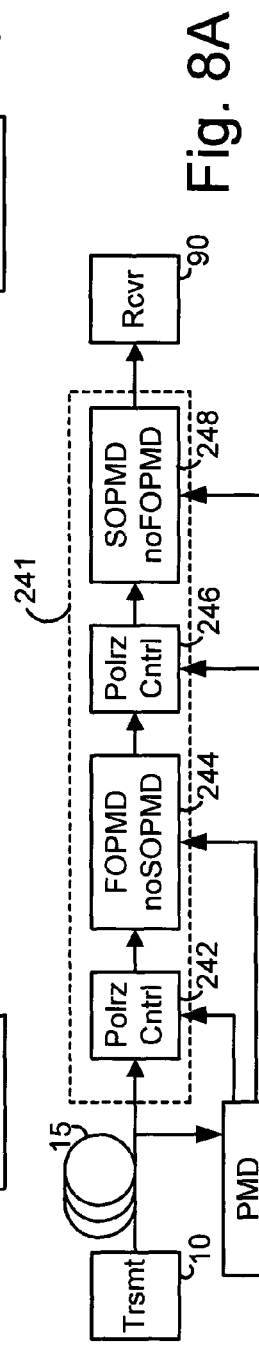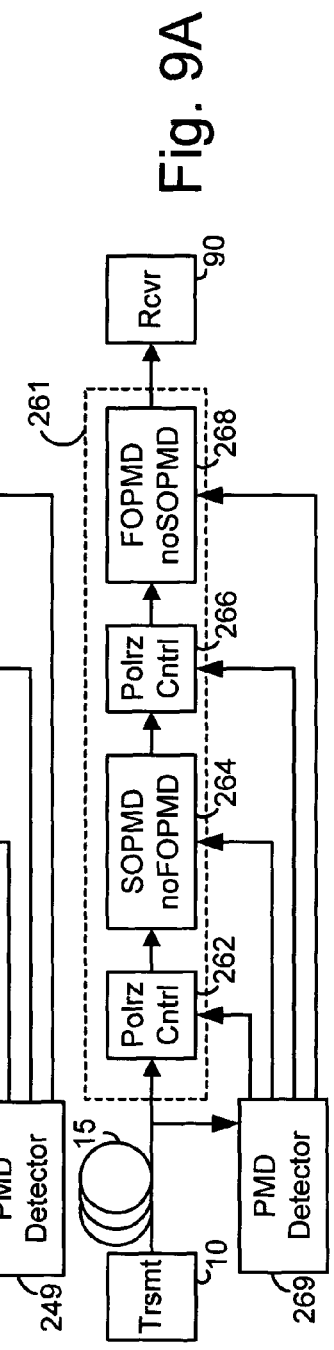

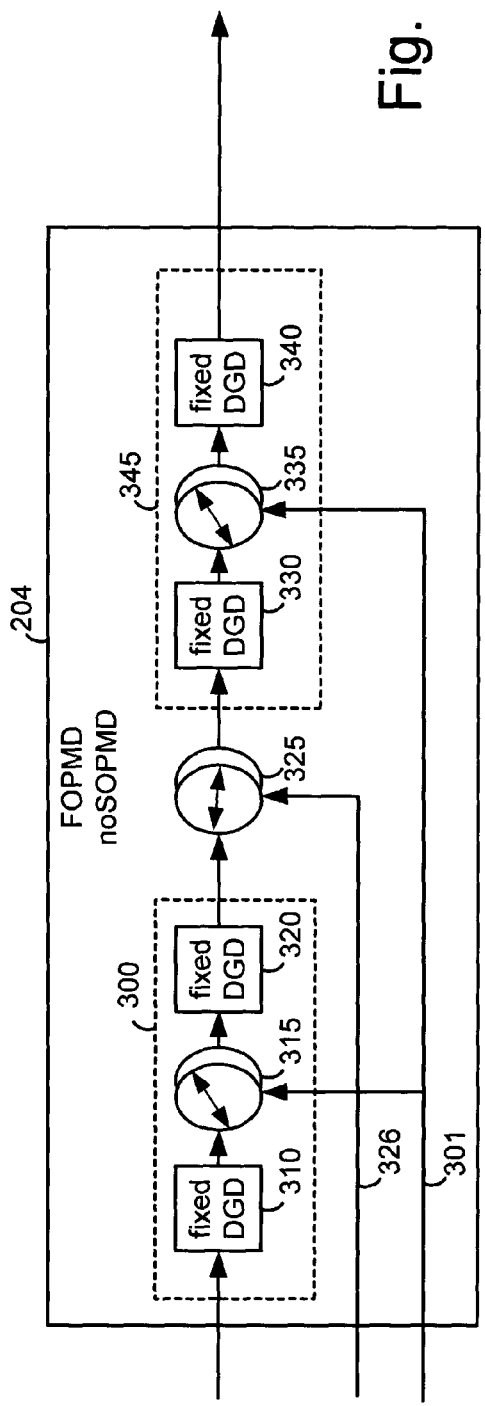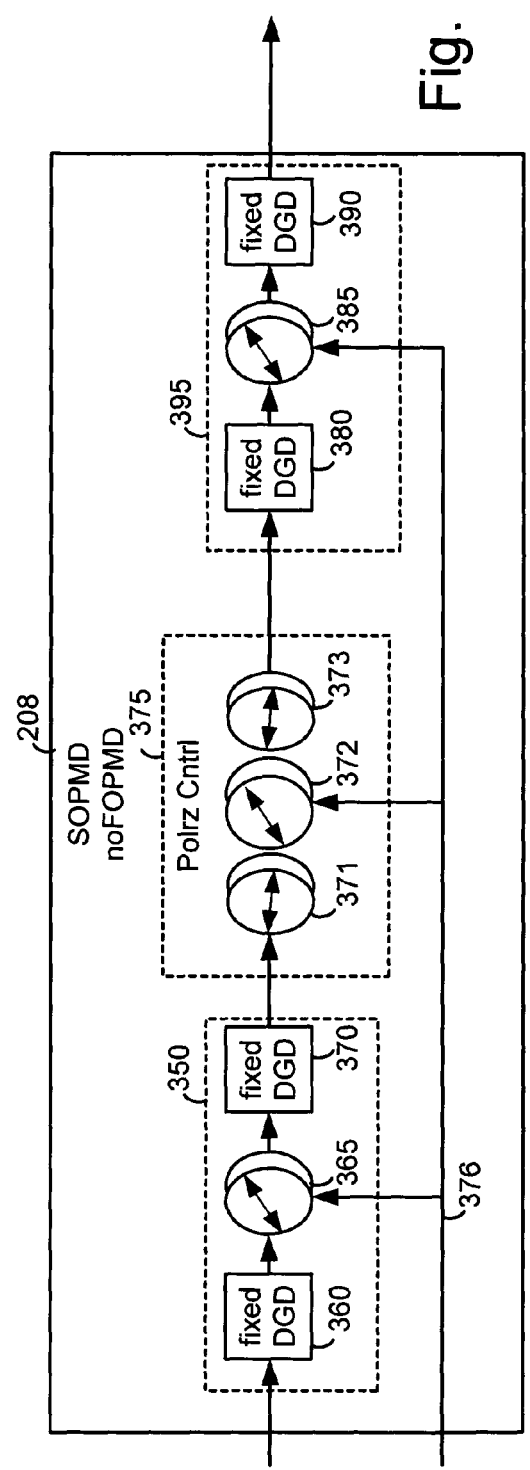

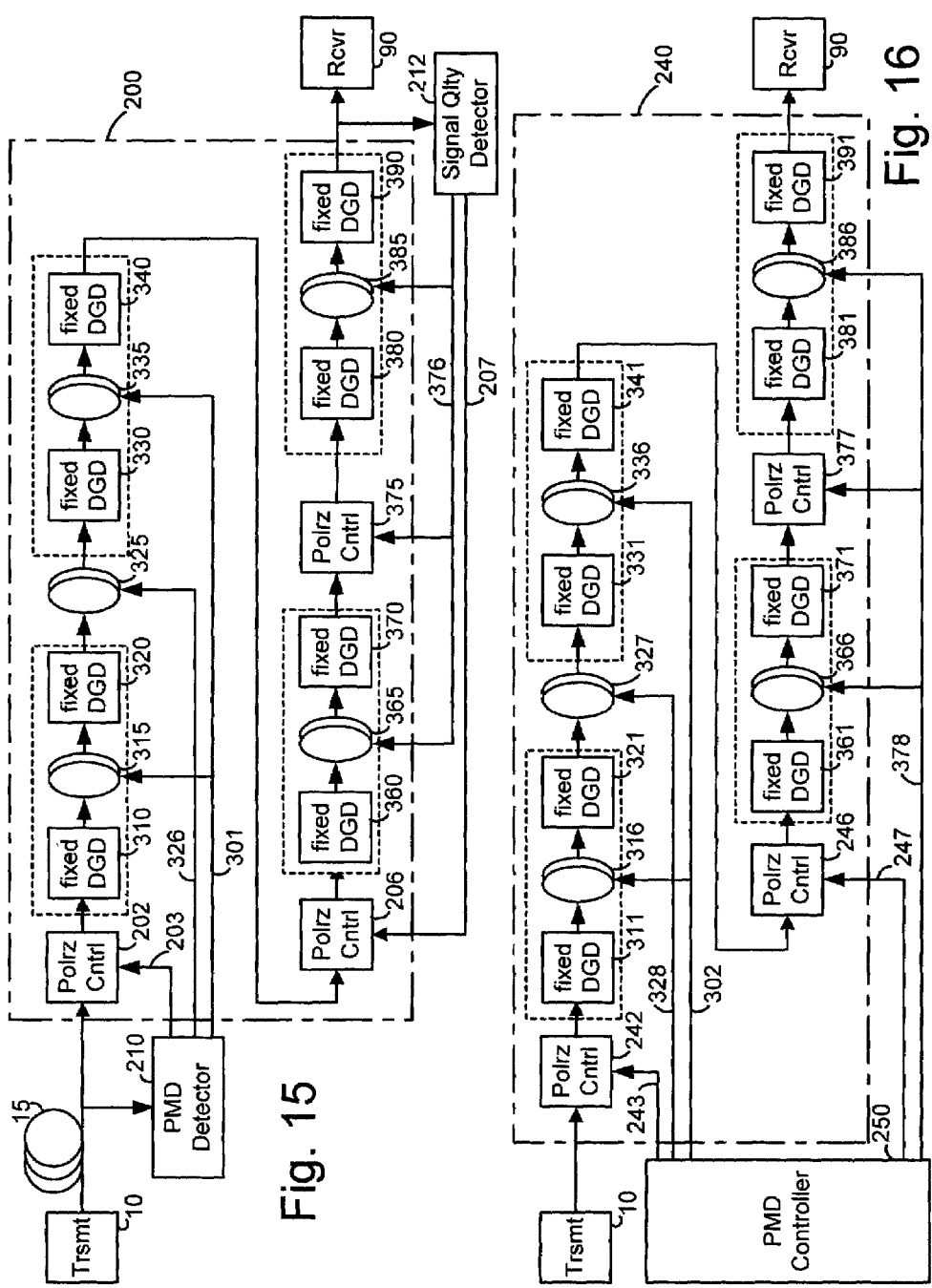

INDEPENDENTLY VARIABLE FIRST AND SECOND ORDER POLARIZATION MODE DISPERSION COMPENSATOR

CROSS-REFERENCE TO RELATED APPLICATIONS

This application claims priority from U.S. provisional patent applications Ser. Nos. 60/413,964 and 60/413,801, both filed Sep. 26, 2002, both having common inventors and a common assignee herewith.

BACKGROUND OF THE INVENTION

The present invention relates to fiber optic systems, and more particularly, is directed to a polarization mode dispersion compensator for long fiber cables.

Polarization mode dispersion (PMD) generally refers to variations in the time delay of a polarized optical signal traveling through an optical transmission system, such as a single-mode optical fiber. PMD arises in an optical fiber because of asymmetries in the optical fiber core, such as core ellipticity created during optical manufacturing and bending stresses resulting from handling the fiber or installing the fiber. Asymmetries in the fiber core cause random changes in the state of polarization (SOP) of optical signals propagating through the fiber. Different SOPs propagate through the optical fiber core at different speeds, resulting in pulse distortion in a transmitted optical signal. Additionally, asymmetries in the core are susceptible to environmental changes, such as temperature or fiber movement, which occur rapidly and further distort the transmitted optical signal.

First order PMD refers to a time delay between two orthogonally polarized principal states of polarization (PSPs). The PSPs are a convenient basis set to describe and characterize each SOP and to evaluate the effects of PMD in the fiber. Using the PSPs as a basis set, each SOP propagating through the fiber is represented as a linear combination of the two orthogonally polarized PSPs. The pulse distortion is a function of the varying delay between the PSPs.

Second order PMD refers to the frequency dependence of the first order PSP. Second order PMD further distorts the optical signal propagating in the fiber.

Differential group delay (DGD) is the delay time between the two principal states of polarization in single-mode fiber caused by different propagation group velocities of the modes. The DGD is a function of wavelength and fiber environment and fluctuates in time. Therefore a single DGD measurement cannot characterize a fiber. Instead a PMD measurement is necessary, corresponding to an average or root mean square (rms) value of DGD over some wavelength range, depending on the method.

FIG. 1 shows a feedforward PMD compensator. Transmitter 10 sends a lightwave signal along optical fiber 15 to a beam splitter (not shown) that provides the lightwave signal to PMD detector 2 and to PMD compensator 1. Transmitter 10 includes a light source, such as a laser diode, and optionally includes a polarization scrambler that randomly varies the polarization state of the optical signal prior to providing the optical signal to optical fiber 15. PMD detector 2 calculates the PMD present in the transmitted lightwave, and controls PMD compensator 1 to compensate for the PMD in the transmitted lightwave. PMD compensator 1 compensates the transmitted lightwave, and delivers a compensated lightwave to receiver 90.

Co-pending U.S. patent application Ser. No. 10/338,278, filed Jan. 8, 2003, having common inventors and assignee herewith, presents a PMD feedforward compensator capable of fully compensating first and second order PMD.

FIG. 2 shows the PMD compensator of the '278 application. PMD detector 25 produces control signals 40, 45, 50 and 55 for PMD compensator 100. The output of PMD compensator 100 is a corrected lightwave signal that is substantially devoid of first and second order PMD. The corrected signal is supplied to receiver 90. PMD detector 25 comprises optical filter 28, polarimeter 30 and processor 35. The operation of PMD detector 25 is generally described in co-pending U.S. patent application Ser. No. 10/263,779, filed Oct. 4, 2002, having a common inventor and assignee herewith, the disclosure of which is hereby incorporated by reference in its entirety. PMD compensator 100 comprises differential group delays (DGDs) 65, 75, 85 serving as three first order PMD segments, and PCs 60, 70, 80, serving as polarization rotators. PCs 60, 70, 80 are each a cascade of two or three tunable wave-plates with fixed slow axis of orientation, or may each be a cascade of two or three fixed wave-plates with adjustable slow axis of orientation. DGD 65 is adjustable and thus enables adjustment of the DGD. Control signals 40, 45, 50 and 55 are respectively supplied to PC 60, DGD 65, PC 70 and PC 80. The '278 application recognizes that the variable DGD segment can be replaced with a concatenation of fixed DGD segments.

Conventionally, a mechanical approach is used to generate variable DGD, that is, the two orthogonal polarization components are separated using a polarization beam splitter and then a path difference is introduced between them. Finally, the two polarization components are recombined using a polarization beam combiner. This approach requires mechanical movements, and thus operates at slow speed (sub-second), and has large output polarization fluctuation and poor control stability. In addition, this mechanical variable delay line introduces substantial optical loss.

Alternatively, variable DGD can be generated by concatenating two fixed DGD segments via a polarization controller. However, this results in a second order PMD vector perpendicular to the resultant first order PMD vector, which causes rotation of the principal state of polarization as one moves away from the center wavelength.

Thus, there is a need for a further improved PMD compensator.

FIG. 3 shows a PMD generator, also referred to as a PMD emulator. In a development lab, or when investigating optical signal behavior, it is desirable to generate PMD and apply it to equipment (not shown) being tested. Generally, PMD controller 7 is programmed to control PMD generator 6 to create desired types of distortion in the lightwave signal from transmitter 10. The intentionally distorted signal is then delivered to receiver 90. Equipment being tested is inserted at an appropriate place.

The operational requirements of PMD generator 6 are less stringent than those of PMD compensator 1, as PMD compensator 1 has to deal with all types of real world conditions in real time, whereas PMD generator 6 is useful even if it operates in only a limited way and relatively slowly.

If the required compensation is within the operational capability of PMD generator 6, then PMD generator 6 can be used in place of PMD compensator 1.

U.S. Patent Application Publication No. 2002/0118455, published Aug. 29, 2002, shows a feedforward PMD generator wherein first order PMD and second order PMD can be selected from separate contours to provide constant DGD.

FIG. 4 shows the PMD generator of the '455 publication. PMD generator 115 comprises four serial stages, with a half-waveplate mode mixer between adjacent stages. Each stage includes a fixed DGD and a phase compensator, shown in FIG. 4 as a phase shifter. Fixed DGDs 101, 104, 107, 110 are substantially identical. Phase compensators 102, 105, 108, 111 are also substantially identical, that is, are controlled to be identical via a control signal from PMD controller 112. Mode mixers 103 and 109 are controlled by the same signal from PMD controller 112. Mode mixer 106 is controlled by its own control signal from PMD controller 112.

By appropriately setting the control signals, PMD controller 112 controls PMD generator 115 to produce a DGD spectrum that is aligned with a wavelength division multiplexed (WDM) comb spectrum, imparting the same amount of PMD to each WDM channel.

The behavior of PMD generator 115 is complicated, and not readily described via equations. The '455 publication teaches creating a set of operational curves for PMD generator 115, apparently by observing its behavior, and then incorporating these operational curves in PMD controller 112 as a control algorithm or look-up table.

Drawbacks of the PMD generator of the '455 publication include that it is slow due to relying on mechanical movement of the phase compensators 102, 105, 108, 111 and mode mixers 103, 106, 109, and that it controls only the magnitude of the generated PMD, i.e., does not control the direction of the generated PMD.

FIG. 5 shows another recent approach to using variable DGD. The device of FIG. 5 is a concatenation of six switch/delay sections. Each switch/delay section consists of a magnetoptic polarization switch and a birefringent crystal. The lengths of the birefringent crystals are a binary power series, increasing by a factor of 2 for each section. While the binary power series lengths approach of FIG. 5 is acceptable for a PMD emulator, it is not suitable for PMD compensation since it does not provide continuous tuning.

A birefringent crystal has different reflective indices for its two different orthogonal polarizations. The fast axis is the one with the smaller reflective index.

The PMD generators described above still leave room for an improved PMD compensator.

SUMMARY OF THE INVENTION

In accordance with an aspect of this invention, there are provided an apparatus and a method for compensating or generating polarization mode dispersion (PMD) for an optical fiber. The magnitude of the first and second order PMD in a lightwave signal, and the direction of the first and second order PMD in the lightwave signal are controlled.

In a further form of this aspect, the magnitude of the first order PMD is controlled separately from the magnitude of the second order PMD. Controlling the magnitude of the first order PMD comprises producing a first portion of the desired first order PMD magnitude and a first determined amount of second order PMD, producing a second portion of the desired first order PMD magnitude and a second determined amount of second order PMD, and adjusting a coupling of the first means and second means to produce the full amount of desired first order PMD magnitude and to produce no second order PMD. Controlling the direction of first and second order PMD includes aligning the produced first order PMD magnitude to cancel the first order PMD of the optical fiber. Controlling the magnitude of the second order PMD comprises producing a first portion of the desired second order PMD magnitude and a first determined amount of first order PMD, producing a second portion of the desired second order PMD magnitude and a second determined amount of first order PMD, and adjusting a coupling of the first means and second means to produce the full amount of desired second order PMD magnitude and to produce no first order PMD. Controlling the direction of first and second order PMD includes aligning the produced second order PMD magnitude to cancel the second order PMD of the optical fiber.

In accordance with another aspect of this invention, an apparatus for compensating polarization mode dispersion (PMD) in a lightwave signal comprises a first module for compensating first order PMD without affecting second order PMD, and a second module for compensating second order PMD without affecting first order PMD, wherein the first and second modules are separately controlled.

In a further form of this aspect, the first module comprises first and second portions, each for producing second order PMD alterations that cancel each other, and a tuner for adjusting the coupling of the first and second portions so that each of the first and second portions produces half of the first order PMD alteration. The second module comprises first and second portions, each for producing first order PMD alterations that cancel each other, and a tuner for adjusting the coupling of the first and second portions so that each of the first and second portions produces half of the second order PMD alteration. The first module may be controlled in a feedforward manner while the second module is controlled in a feedback manner, or both of the first and second modules may be controlled in a feedforward manner.

In accordance with yet another aspect of this invention, an apparatus for generating polarization mode dispersion (PMD) in a lightwave signal comprises a first module for generating first order PMD without affecting second order PMD, and a second module for generating second order PMD without affecting first order PMD, wherein the first and second modules are separately controlled.

In accordance with still another aspect of this invention, a module for altering first order polarization mode dispersion (PMD) without altering second order PMD in a lightwave signal comprises first and second portions, each for producing second order PMD alterations that cancel each other, and a tuner for adjusting the coupling of the first and second portions so that each of the first and second portions produces half of the first order PMD alteration.

In accordance with yet another aspect of this invention, a module for altering second order polarization mode dispersion (PMD) without altering first order PMD in a lightwave signal comprises first and second portions, each for producing first order PMD alterations that cancel each other, and a module tuner for adjusting the coupling of the first and second portions so that each of the first and second portions produces half of the second order PMD alteration.

It is not intended that the invention be summarized here in its entirety. Rather, further features, aspects and advantages of the invention are set forth in or are apparent from the following description and drawings, in which the like elements are indicated by like reference numbers.

BRIEF DESCRIPTION OF THE DRAWINGS

FIG. 1 is a block diagram showing feedforward PMD compensation;

FIG. 2 is a block diagram showing a feedforward PMD compensator;

FIGS. 6, 7, 8A and 9A are block diagrams of PMD compensators according to the present invention;

FIG. 10 is a block diagram of a FOnSO module according to the present invention;

FIG. 14 is a block diagram of a SOnFO module according to the present invention; and FIGS. 15 and 16 are block diagrams corresponding to FIGS. 6 and 8B, but showing more detail.

DETAILED DESCRIPTION

A PMD compensator or generator includes one module for adjusting first order PMD without altering second order PMD, and another module for adjusting second order PMD without altering first order PMD.

The modules enable separate, that is, decoupled, compensation of first and second order PMD. First order PMD can be calculated and compensated in a feedforward manner, which is fast and precise, while second order PMD can be compensated in a feedback manner that searches for an optimum without affecting the first order PMD compensation. The modules also enable separate generation, that is, emulation, of first and second order PMD, and can be used in a completely deterministic configuration to achieve the desired PMD. In some studies, it is desired to investigate the effects of first and second order PMD separately, thus decoupling of first and second order PMD emulation is necessary.

Figure 3:
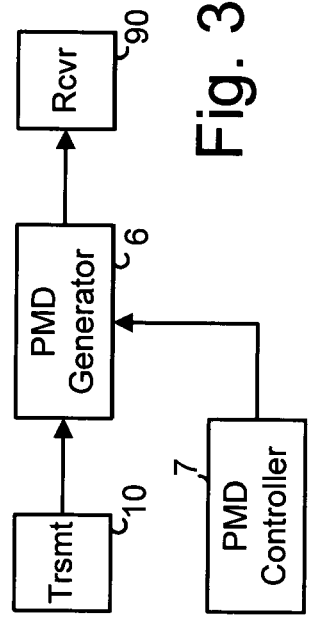
FIG. 3 is a block diagram showing showing feedforward PMD generation.
Figure 4:
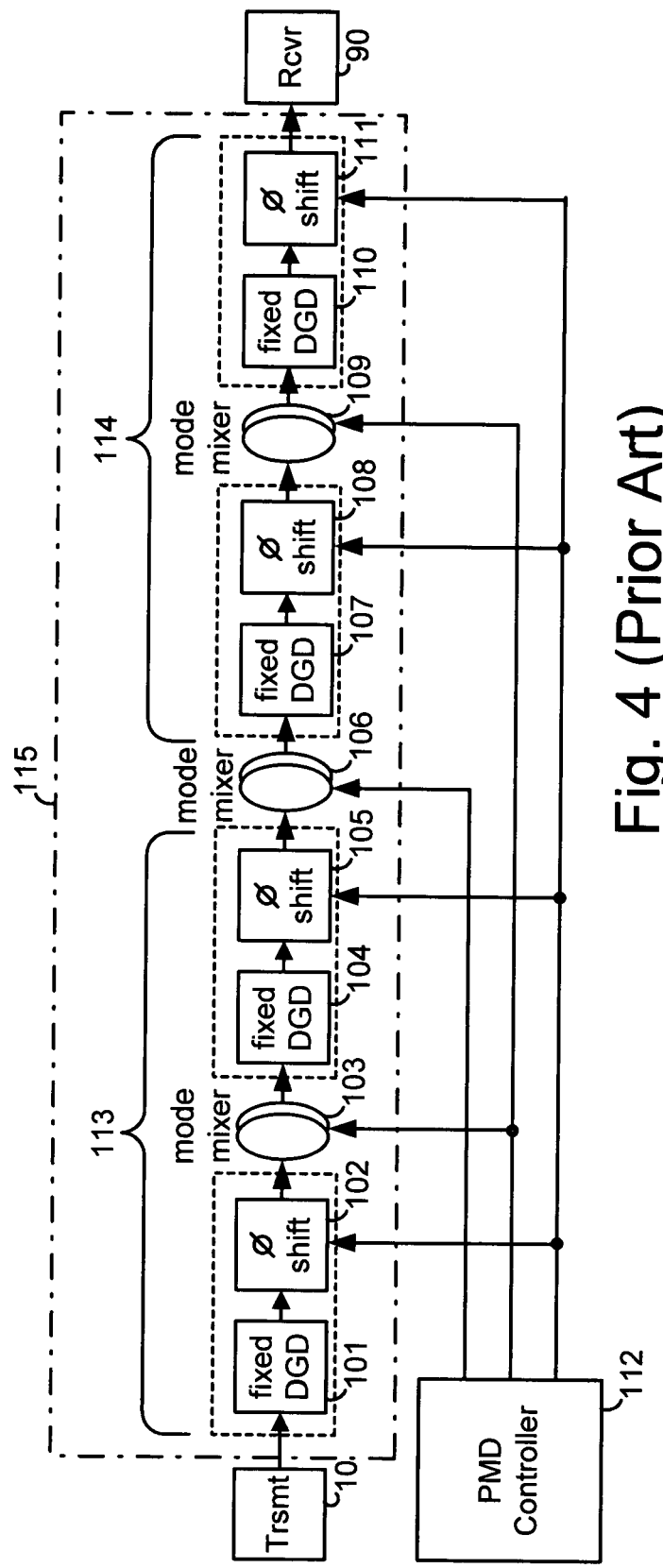
FIG. 4 is a block diagram showing a feedforward PMD generator.
Figure 5:
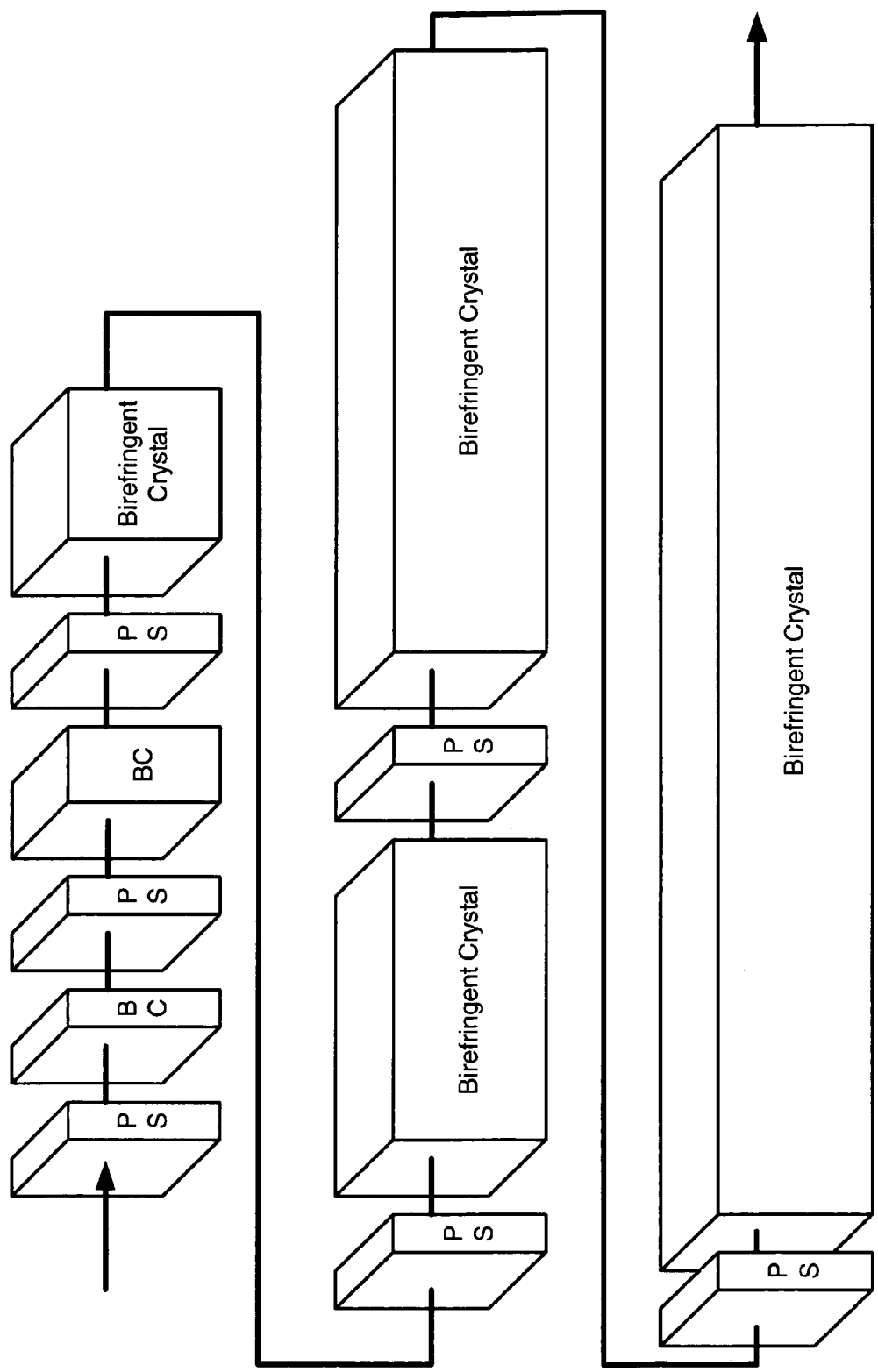
FIG. 5 is a block diagram of a PMD generator according to the binary power series lengths approach.
Figures 8B, 9B:
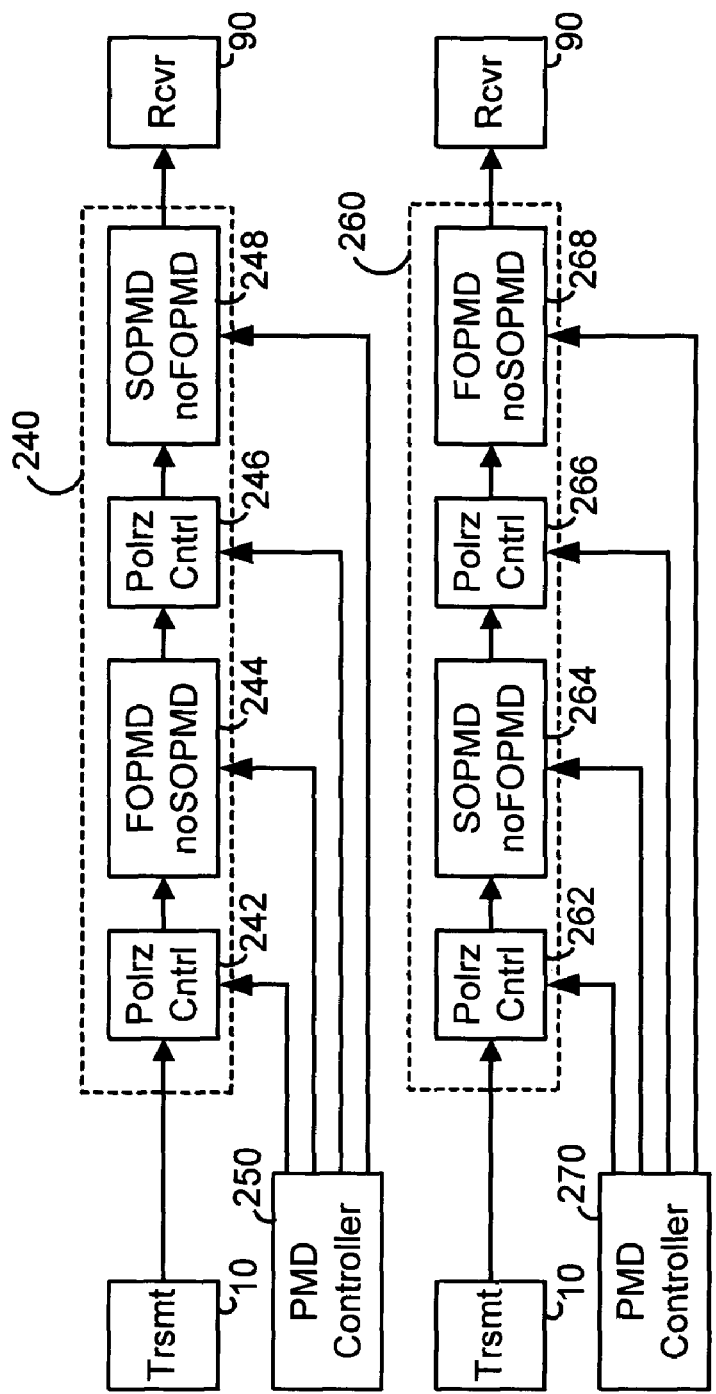
FIGS. 8B and 9B are block diagrams of PMD generators according to the present invention.

FIGS. 6 and 7 show PMD compensators having a hybrid feedforward/feedback configuration. FIGS. 8A and 9A show PMD compensators having a feedforward configuration. FIGS. 8B and 9B show PMD generators having a deterministic configuration. Each of the devices in FIGS. 6–9 includes a module for generating first order PMD without affecting second order PMD, referred to as a FOnSO module, and another module for adjusting second order PMD without affecting first order PMD, referred to as a SOnFO module. The modules are serially coupled. In FIGS. 6, 8A and 8B, the FOnSO module precedes the SOnFO module, while in FIGS. 7, 9A and 9B, the SOnFO module precedes the FOnSO module.

The FOnSO module is a concatenation of four identical fixed DGD segments so that the resultant DGD is variable while no second order PMD is produced. In addition, the third order PMD is only half the value of the third order PMD produced by two fixed segments achieving the same DGD tuning range. In one embodiment, the four segment FOnSO module is based totally on tunable phase-plates and fixed DGD segments, so that the following two approaches are different practical implementations that provide high speed, compactness and stability: first, using birefringent crystals with electro-optic or magneto-optic tunable phase-plates and second, integrating the whole module on a wafer based on micro-electro-optical-mechanical systems (MEMS) technology.

The SOnFO module is based on four identical fixed DGD segments arranged in a symmetrical manner. Using this symmetry, there is only one control parameter to vary the magnitude of second order PMD, and its solution is extremely simple. When it is used with an additional polarization controller, it can generate arbitrary second order PMD vectors without first order PMD. In one embodiment, the four segment SOnFO module is based totally on tunable phase-plates and fixed DGD segments, so that the following two approaches are two practical implementations that provide high speed, compactness and stability: first, using birefringent crystals with electro-optic or magneto-optic tunable phase-plates and second, integrating the whole module on a wafer based on MEMS technology.

Configurations

FIG. 6 comprises transmitter 10, optical fiber 15, PMD compensator 200, PMD detector 210, signal quality detector 212, and receiver 90. Transmitter 10 sends a lightwave signal along optical fiber 15 to a beam splitter (not shown) that provides the lightwave signal to PMD detector 210 and to PMD compensator 200. Transmitter 10 includes a light source, such as a laser diode, and optionally includes a polarization scrambler that randomly varies the polarization state of the optical signal prior to providing the optical signal to optical fiber 15.

PMD detector 210 calculates the first order PMD present in the transmitted lightwave, and controls PMD compensator 200 to compensate for the first order PMD in the transmitted lightwave. PMD compensator 200 compensates PMD in the transmitted lightwave, and delivers a compensated lightwave to another beam splitter (not shown) that provides the compensated lightwave signal to receiver 90 and to signal quality detector 212.

Signal quality detector 212 measures the signal quality, such as via its eye diagram, in the compensated lightwave and controls PMD compensator 200 to optimize the signal quality in the compensated lightwave. PMD compensator 200 compensates for the first and second order PMD in the received lightwave signal. The first order PMD compensation occurs in a feedforward manner, while the second order PMD compensation occurs in a feedback manner. PMD detector 210 and signal quality detector 212 can be of conventional components configured to produce the control signals described below.

PMD compensator 200 is a serial coupling of polarization controller (PC) 202, FOnSO 204 (discussed below), PC 206 and SOnFO 208 (discussed below). PCs 202, 206 may each be a cascade of two or three tunable wave-plates with fixed slow axis of orientation, or may each be a cascade of two or three fixed wave-plates with adjustable slow axis of orientation.

FOnSO 204 and SOnFO 208 produce the necessary magnitude for the first and second order PMD vectors, but not their direction.

PC 202 services to align the first order PMD generated by FOnSO 204 so as to cancel the first order PMD of the fiber. PC 206 services to align the second order PMD generated by SOnFO 208 to cancel the second order PMD of the fiber. Thus, PC 202 and PC 206 control the direction of the first and second order PMD vectors.

FIG. 7 comprises transmitter 10, optical fiber 15, PMD compensator 220, PMD detector 230, signal quality detector 232 and receiver 90. FIG. 7 is similar to FIG. 6 except that in PMD compensator 220, SOnFO 224 precedes FOnSO 228 in the serial coupling. For brevity, FIG. 7 is not discussed in detail.

FIG. 8A comprises transmitter 10, optical fiber 15, PMD compensator 241, PMD detector 249 and receiver 90. Transmitter 10 supplies a lightwave signal to optical fiber 15 and thence to PMD compensator 241. PMD detector 249 supplies control signals to PMD compensator 241, and in response thereto, PMD compensator 241 generates desired quantities of first and second order PMD. PMD detector 249 operates in a totally feedforward manner. PMD compensator 241 is a serial coupling of PC 242, FOnSO 244 (discussed below), PC 246 and SOnFO 248 (discussed below).

FIG. 8B is similar to FIG. 8A, except optical fiber 15 is omitted, PMD generator 240 replaces PMD compensator 241, and PMD controller 250 replaces PMD detector 2490. PMD controller 250 operates in a deterministic manner. For brevity, FIG. 8B is not discussed in detail.

FIG. 9A comprises transmitter 10, optical fiber 15, PMD compensator 261, PMD detector 269 and receiver 90. FIG. 9A is similar to FIG. 8, except that in PMD compensator 261, SOnFO 264 precedes FOnSO 268 in the serial coupling. For brevity, FIG. 9A is not discussed in detail.

FIG. 9B is similar to FIG. 9A except optical fiber 15 is omitted, PMD generator 260 replaces PMD compensator 261, and PMD controller 270 replaces PMD detector 269. For brevity, FIG. 9B is not discussed in detail.

FOnSO Module

The FOnSO module will now be discussed. FOnSO 204 produces DGD that is variable with no second order PMD. In addition, the third order PMD produced by FOnSO 204 is only half the value of the third order PMD produced in the concatenation of two fixed segments with the same DGD tuning range.

FIG. 10 shows FOnSO 204, comprising first block 300 supplying a lightwave signal to tunable phase-plate 325 that then supplies a lightwave signal to second block 345.

First block 300 comprises a serial coupling of fixed DGD 310, tunable phase-plate 315, and fixed DGD 320. First block 300 serves to receive the lightwave signal supplied to FOnSO 204.

Second block 345 comprises a serial coupling of fixed DGD 330, tunable phase-plate 335, and fixed DGD 340. Second block 345 serves to generate the lightwave signal produced by FOnSO 204.

Tunable phase-plate 325 is characterized by a tuning parameter $\theta_{C_1}$ and the rotation axis is the x-direction in Stokes space, equivalent to a horizontal linearly polarized birefringence axis. Control signal 326 adjusts tunable phase-plate 325.

Tunable phase-plates 315 and 335 are characterized by a tuning parameter $\theta_{C_0}$ and each has a rotation axis in the y-direction in Stokes Space, equivalent to a 45 degree linearly polarized birefringence axis. Control signal 301 adjusts tunable phase-plates 315 and 335.

Tunable phase-plates 315, 325, 335 can either be electro-optic or magneto-optic, enabling high speed tuning of DGD.

Fixed DGD 310, 320, 330 and 340 are identical fixed DGD segments. In Stokes space representation, each fixed DGD 310, 320, 330, 340 has first order PMD, $\vec{\tau} = \{|\vec{\tau}|, 0, 0\}$ and a rotation matrix, R, whose rotation axis is the x-direction and rotation angle is $\theta_R$. Polarization-maintaining fibers are used as fixed DGD segments. In other embodiments, birefringent crystals, which provide compactness and stability, are used as fixed DGD segments. In yet other embodiments, FOnSFO 204 is integrated on a wafer based on MEMS technology; the fixed DGD segments are simply fixed delay lines in free space while the tunable phase-plates are finely-adjustable delay lines in free space.

First block 300 produces first order PMD, $\vec{\tau}'$, and second order PMD, $\vec{\tau}_\omega'$.

$$\vec{\tau}' = \vec{\tau} + RC_0\vec{\tau} \qquad (\text{eq. 1})$$

$$\vec{\tau}_\omega' = \vec{\tau} \times \vec{\tau}' \qquad (\text{eq. 2})$$

Note that $\vec{\tau}'$ and $\vec{\tau}_\omega'$ are perpendicular to each other; this property is used to cancel the second order PMD of the entire structure.

Figure 11A:
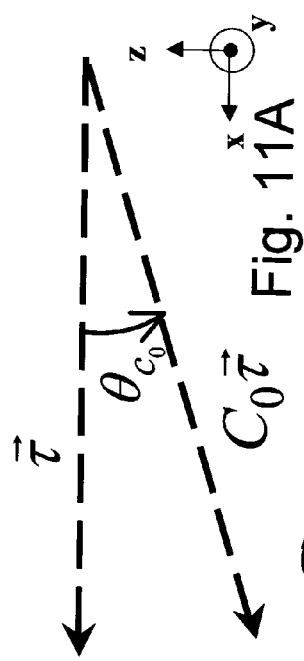
FIGS. 11A–11C are vector diagrams in Stokes space.
Figure 11B:
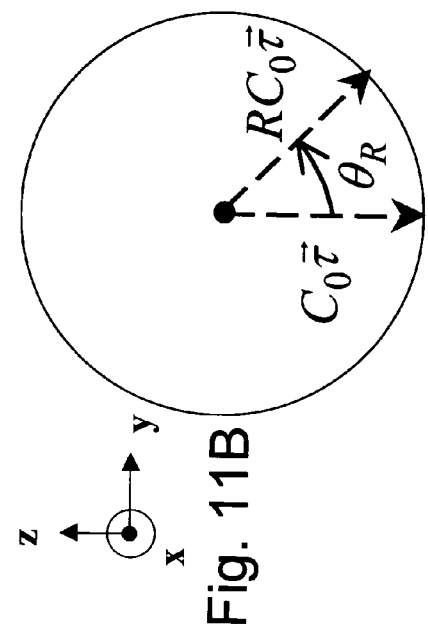
Figure 11C:
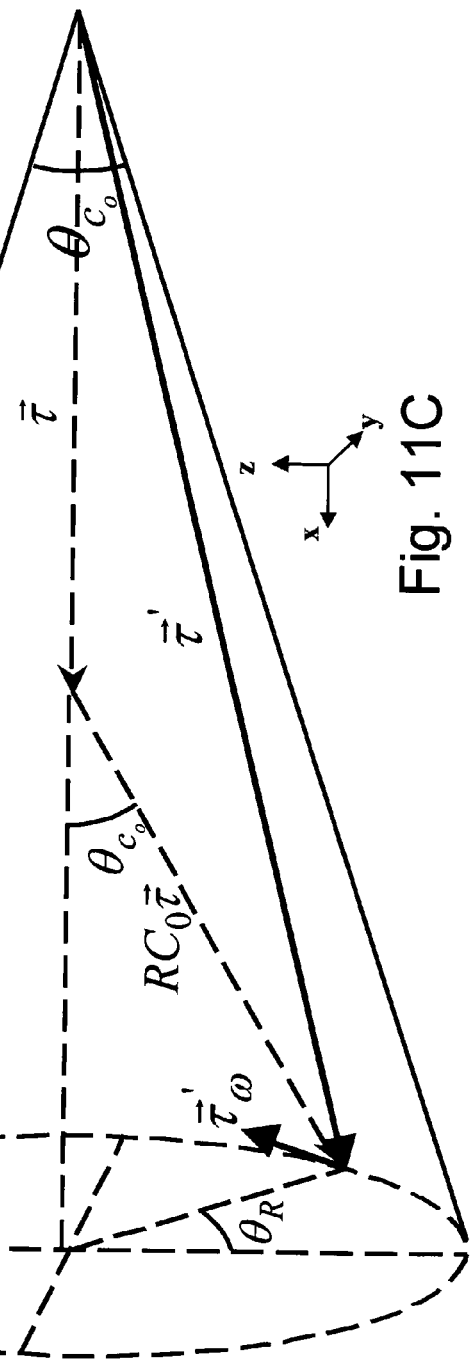

FIGS. 11A–11C, collectively referred to as FIG. 11, illustrate the construction of $\vec{\tau}'$ and $\vec{\tau}_\omega'$ in Stokes space. FIG. 11A shows step 1, the transformation via $C_0$ of $\vec{\tau}$ which corresponds to a rotation of $\theta_{C_0}$ about the y-axis. FIG. 11B shows step 2, the R transformation of $C_0\vec{\tau}$ which corresponds to a rotation of $\theta_R$ about the x-axis. FIG. 11C shows step 3, in which vector addition of $\vec{\tau}$ and $RC_0\vec{\tau}$ gives $\vec{\tau}'$ while the vector product of $\vec{\tau}$ and $RC_0\vec{\tau}$ gives $\vec{\tau}_\omega'$. The rotation matrix of first block 300 is $R_B = RC_0R$.

When first block 300 and second block 345 are identical, and each characterized by $\vec{\tau}'$ and $\vec{\tau}_\omega'$ and are concatenated via tunable phase-plate 325 having parameter $\theta_{C_1}$, the resultant first order PMD vector, $\vec{\tau}_R$, and resultant second order PMD vector, $\vec{\tau}_{\omega R}$, are $$\vec{\tau}_R = \vec{\tau}' + R_B C_1 \vec{\tau}' \qquad (\text{eq. 3})$$

$$\vec{\tau}_{\omega R} = \vec{\tau}_\omega' + R_B C_1 \vec{\tau}_\omega' + \vec{\tau}' \times \vec{\tau}_R \qquad (\text{eq. 4})$$

$C_1$ is a rotational matrix; when the rotational angle is changed, then the matrix is changed.

Tuning the matrix so that $$R_B C_1 \vec{\tau}' = \vec{\tau}' \qquad (\text{eq. 5})$$

$$R_B C_1 \vec{\tau}_\omega' = -\vec{\tau}_\omega' \qquad (\text{eq. 6})$$

Then $$\vec{\tau}_R = 2\vec{\tau}' \qquad (\text{eq. 7})$$

$$\vec{\tau}_{\omega R} = 0 \qquad (\text{eq. 8})$$

Thus, the method of FOnSO 204 for producing variable DGD without second order PMD is as follows:

(a) for any designated DGD value, tune the parameter of phase-plates 315 and 335, $\theta_{C_0}$, so that each of identical blocks 300 and 345 produces half of the designated DGD value, and then (b) tune the parameter of phase-plate 325, $\theta_{C_1}$, so that the first order PMD vectors of the identical blocks 300 and 345 add to give the designated DGD value, while their second order PMD vectors cancel one another.

The value of control signal 301 is $\theta_{C_0}$. The value of control signal 326 is $\theta_{C_1}$. The total tunable DGD range of FOnSO 204 is $4|\vec{\tau}|$, which is the summation of the fixed DGD of each of the DGDs 310, 320, 330, 340 in FOnSO 204.

For any designated DGD value, $|\vec{\tau}_R|=2|\vec{\tau}'|$, the required rotation angle of $C_0$ is found using simple vector algebra, as shown in FIG. 11, $$\cos\left(\frac{\theta_{C_0}}{2}\right) = \frac{|\vec{\tau}_R|}{4|\vec{\tau}|} \quad \text{(eq. 9)}$$

Note that $\vec{\tau}'$ and $\vec{\tau}_\omega'$ are perpendicular to each other. Thus equations (5) and (6) are satisfied by a rotation transformation, $R_B C_1$, that uses $\vec{\tau}'$ as its rotation axis and rotation angle of $\pi$. Since $R_B$ and $\vec{\tau}'$ are known, $C_1$ is computable as:

$$C_1 = R_B^+ T = (RC_0 R)^+ T \quad \text{(eq. 10)}$$

where T is a rotation by $\pi$ about $\vec{\tau}'$. In general, to implement $C_1$ to satisfy (eq. 10), at least three tunable phase-plates are required due to the three parameters contained in an arbitrary rotation transformation. However, due to the symmetry involved in FOnSO 204 and selection of the rotation axes of $C_0$ and R, $C_1$ is a rotation about the x-axis with fixed rotation angle of $$\theta_{C_1} = \pi - 2\theta^R \quad \text{(eq. 11)}$$

This angle remains constant independent of changes in $C_0$ needed to achieve different DGD. The simplicity of the solution of $C_1$ favors practical implementation of the module.

Figure 12A:
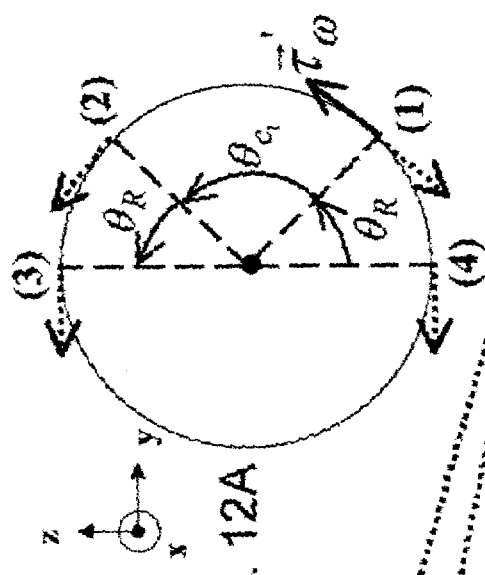
FIGS. 12A–12B are vector diagrams in Stokes space.
Figure 12B:
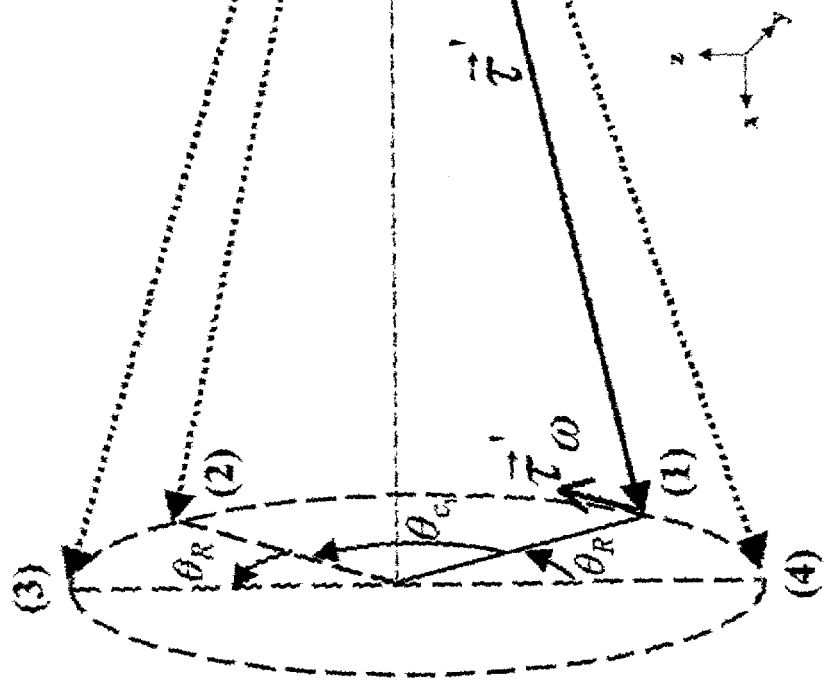

FIGS. 12A–12B, collectively referred to as FIG. 12, depict the vector transformation, $R_B C_1 (= RC_0 RC_1)$ of $\vec{\tau}'$ and $\vec{\tau}_\omega'$ in Stokes space to explain the solution of $C_1$ in (eq. 11). From point (1) to point (2), vectors $\vec{\tau}'$ and $\vec{\tau}_\omega'$ are transformed by $C_1$ which corresponds to a rotation of $\theta_{C_1}$ about the x-axis caused by tunable phase-plate 325. From point (2) to point (3), the vectors are further transformed by R, which corresponds to a rotation of $\theta_R$ about the x-axis, caused by DGD 330. From point (3) to point (4), the vectors are transformed by $C_0$, which corresponds to a rotation of $\theta_{C_0}$ about the y-axis, caused by phase-plates 335. Finally, from point (4) back to point (1), another transformation occurs via R, caused by DGD 340. With the rotation angle of $C_1$ given by (eq. 11), $\vec{\tau}'$ acquires its original direction while $\vec{\tau}_\omega'$ is reversed in direction. Therefore the first order PMD vectors of identical blocks 300 and 345 add to give the designated DGD value, while their second order PMD vectors cancel.

When $C_0$ is varied to achieve a different DGD value, the whole transformation procedure can be repeated geometrically to see that the same rotation angle of $C_1$, as in (eq. 11), again satisfies both (eq. 5) and (eq. 6). Thus, to vary the DGD of FOnSO 204, only the rotation angle of $C_0$ needs to be controlled.

In practical implementations, to get identical $\vec{\tau}$ for all four fixed DGDs may not be an issue but one may have difficulty in achieving the same rotation angle, $\theta_R$, for all the DGD segments. Thus, for cases with different rotation angles for the various segments, the solution of $C_1$ is, with "Seg 2" being DGD 320 and "Seg 3" being DGD 330:

$$\theta_{C_1} = \pi - \theta_R^{Seg2} - \theta_R^{Seg3} \quad \text{(eq. 12)}$$

Again the solution is a constant over the whole DGD tuning range, and it is independent of the rotation angle of the first and last segment.

Figures 13A, 13B:
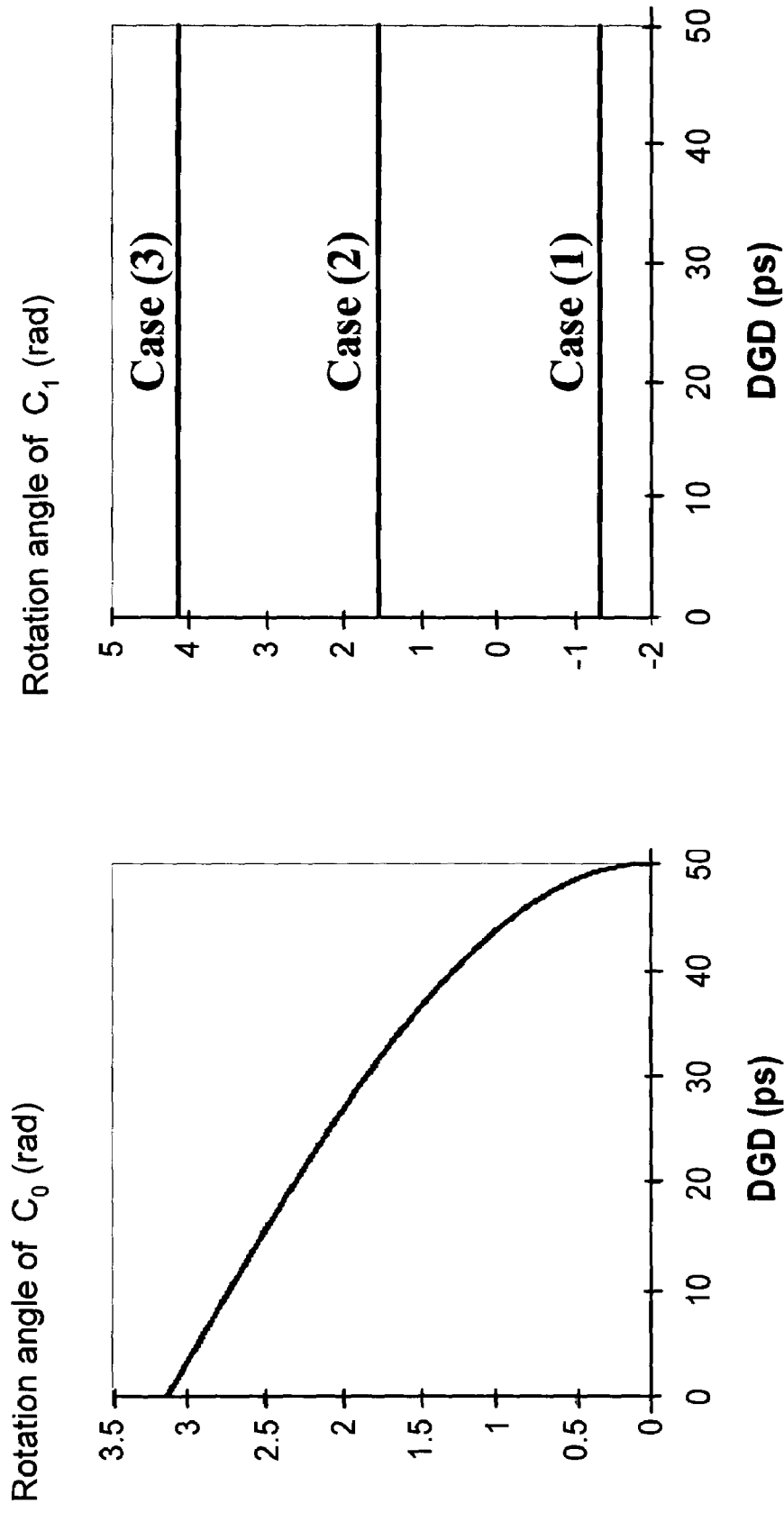
FIGS. 13A–13B are charts showing tunable phase-plate parameters as a function of desired DGD.

FIG. 13A shows the numerical solution of the required rotation angle of $C_0$ of phase-plates 315 and 335 for the various designated DGD values. For zero DGD, the rotation angle of $C_0$ has to be $\pi$ so that $\vec{\tau}$ of each segment in the block must cancel and produce no DGD for the segment block. On the other hand, to produce the maximum DGD value, which is 50 ps in this case, $\vec{\tau}$ of each segment must be aligned, thus the rotation angle of $C_0$ has to be zero. The solution of $C_0$ is continuous, and there is no transient DGD fluctuation when the DGD settings change.

FIG. 13B shows the required rotation angle of $C_1$ of phase-plate 325 for three different cases:
 (1) rotation angle of all segments are equal to 2.23 rad;
 (2) rotation angles of—2.8, -1.7, 3.3, 5.1 rads for DGDs 310, 320, 330, 340, respectively;
 (3) rotation angles of 4.5, 2.5, -3.5, 1.5 rads for DGDs 310, 320, 330, 340, respectively.

For case (2) and (3), the rotation angles are randomly chosen to illustrate solutions of (eq. 12). These solutions of $C_1$ in FIG. 13B are numerically computed using (eq. 10) and agree with (eq. 12). The solutions remain constant for the whole DGD tuning range. However, the above discussion is only valid when the rotation angles of these segments do not drift over time. If there are drifts in these angles, continuous tuning of $C_1$ is necessary using (eq. 12). It is preferred to avoid these drifts so that the rotation angle of $C_0$ is the only variable control for FOnSO 204. Drifts can be avoided by a temperature controlled and mechanically stabilized environment.

SOnFO Module

The SOnFO module will now be discussed. Due to the symmetry of the SOnFO module, it is possible to generate second order PMD having variable magnitude, and being devoid of first order PMD, by simply adjusting one control parameter of the module.

FIG. 14 shows SOnFO 208, comprising first block 350 supplying a lightwave signal to PC 375 that then supplies a lightwave signal to second block 395. First block 350 has first order PMD, $\vec{\tau}_1$, and second order PMD, $\vec{\tau}_{\omega 1}$. Second block 395 has first order PMD, $\vec{\tau}_2$, second order PMD, $\vec{\tau}_{\omega 2}$, and a polarization rotation matrix, $R_2$.

First block 350 comprises a serial coupling of fixed DGD 360, tunable phase-plate 365, and fixed DGD 370. First block 350 serves to receive the lightwave signal supplied to SOnFO 208. In Stokes space representation, fixed DGD segments 360 and 370 have first order PMD, $\vec{\tau} = \{|\vec{\tau}|, 0, 0\}$, equivalent to having the slow birefringence axes oriented in the horizontal direction in physical space. DGDs 360 and 370 each have rotation matrices, R, whose rotation axis is in the x-direction in Stokes space. Tunable phase-plate 365 has rotation matrix $C_{10}$; its rotation axis is along the y-direction in Stokes space, equivalent to a 45 degree linearly polarized birefringence axis.

PC 375 comprises a serial coupling of fixed phase-plate 371, tunable phase-plate 372 and fixed phase-plate 373. Let C be the rotation matrix for PC 375. The rotation of fixed phase-plate 371 and fixed phase-plate 373 are $R^+$ and $R$ respectively, while the rotation of phase-plate 372 is tunable as $C_{10}^+$.

Second block 395 comprises a serial coupling of fixed DGD 380, tunable phase-plate 385, and fixed DGD 390. Second block 395 serves to generate the lightwave signal produced by SOnFO 208. Fixed DGDs 380 and 390 have first order PMD, $-\vec{\tau}$, similarly to DGD 360 and 370 except that the slow birefringence axes of DGDs 380 and 390 are in the vertical direction in physical space. Thus, DGDs 380 and 390 have rotation matrices, $R^+$.

Control signal 376 adjusts tunable phase-plates 365, 372 and 385, that can either be electro-optic, magneto-optic or liquid crystal wave-plates, enabling high speed tuning of the magnitude of second order PMD.

Fixed DGDs 360, 370, 380 and 390 are assumed to have negligible second order PMD. DGDs 360, 370, 380, 390 are birefringent crystals, providing compactness and stability. In another embodiment, DGDs 360, 370, 380, 390 are polarization-maintaining fibers. In yet another embodiment, SOnFO 208 is integrated on a wafer based on MEMS technology, and the fixed DGD segments are simply fixed delay lines in free space while the tunable phase-plates are finely-adjustable delay lines in free space.

By PMD concatenation rules, the resultant first order PMD vector, $\vec{\tau}_R$, of SOnFO 208 is $$\vec{\tau}_R = \vec{\tau}_2 + R_2 C \vec{\tau}_1 \quad \text{(eq. 101)}$$

while the resultant second order PMD, $\vec{\tau}_{\omega R}$, is $$\vec{\tau}_{\omega R} = \vec{\tau}_{\omega 2} + R_2 C \vec{\tau}_{\omega 1} + \vec{\tau}_2 \times \vec{\tau}_R \quad \text{(eq. 102)}$$

For block 350, $$\vec{\tau}_1 = \vec{\tau} = RC_{10}\vec{\tau} \quad \text{(eq. 103)}$$

$$\vec{\tau}_{\omega 1} = \vec{\tau} \times RC_{10}\vec{\tau} \quad \text{(eq. 104)}$$

And for block 395, $$\vec{\tau}_2 = -\vec{\tau} - R^+C_{10}\vec{\tau} = -R^+R^+(RR\vec{\tau} + RC_{10}\vec{\tau}) = -R^+R^+\vec{\tau}_1 \quad \text{(eq. 105)}$$

$$\vec{\tau}_{\omega 2} = -\vec{\tau} \times R^+C_{10}(-\vec{\tau}) = R^+R^+(RR\vec{\tau} RC_{10}\vec{\tau}) = R^+R^+\vec{\tau}_{\omega 1} \quad \text{(eq. 106)}$$

The rotation transformation of R has no effect on $\vec{\tau}$ since its rotation axis is along $\vec{\tau}$, the x-axis in Stokes Space, that is, $RR\vec{\tau} = \vec{\tau}$. Substituting (eq. 105) into (eq. 101), and (eq. 106) into (eq. 102), the following results:

$$\vec{\tau}_R = \vec{\tau}_2 - R_2 CRR\vec{\tau}_2 \quad \text{(eq. 107)}$$

$$\vec{\tau}_{\omega R} = \vec{\tau}_{\omega 2} + R_2 CRR\vec{\tau}_{\omega 2} + \vec{\tau}_2 \times \vec{\tau}_R \quad \text{(eq. 108)}$$

When $R_2CRR=I$, the first order PMD is eliminated while the resultant second order PMD of SOnFO 208 becomes $$\vec{\tau}_{\omega R} = 2\vec{\tau}_{\omega 2} \quad \text{(eq. 109)}$$

And since $R_2 = R^+ C_{10} R^+$, the solution of C is $$C = RC^{10\,+}R^+ \quad \text{(eq. 110)}$$

Thus, the method of SOnFO 208 for producing second order PMD having variable magnitude without first order PMD is as follows: for any designated second order PMD magnitude, adjust the rotation angle of $C_{10}$ as the only control parameter for tunable phase-plates 365, 372 and 385. Each of blocks 350 and 395 produces half of the designated magnitude of second order PMD, and add to give the desired value of second order PMD while their first order PMDs cancel. The total tunable range of the magnitude of second order PMD is $2|\vec{\tau}|^2$. To produce any arbitrary second order PMD vector, PC 206 in FIG. 15 is needed to control the direction of the vector. PC 206 provides the other two degrees of freedom of the second order PMD vector.

In practice, it may be difficult to achieve the same rotation angle, $\theta_R$, for all rotation matrices of the segments. Thus, for cases with different rotation angles for the various segments, the solution for C is $$C = R_{3rdSeg}^+ C_{10}^+ R_{2ndSeg} \quad \text{(eq. 111)}$$

where $R_{2ndSeg}^+$ is the transpose of the rotation matrix of fixed DGD segment 370, and $R_{3rdSeg}^+$ is the transpose of the rotation matrix of fixed DGD segment 380. This means that the rotation of the fixed phase-plates 371 and 373 in PC 375 must be fixed as the transpose of the rotation matrices of delays 370 and 380, respectively. The rotation of tunable phase-plate 372 in PC 375 is $C_{10}^+$. Note that the solution of C is independent of the rotation matrices of first and last delays 360 and 390.

If there are drifts in the rotation angles of the delays, the rotation of fixed phase-plates 371 and 373 cannot be static and instead must be tunable according to (eq. 111). However, drifts can be avoided by a temperature controlled and mechanically stabilized environment. For any designated second order PMD magnitude, $|\vec{\tau}_{\omega R}| = 2|\vec{\tau}_{\omega 2}|$, the required rotation angle of $C_{10}$ is found using simple vector algebra, as follows:

$$\sin(\theta_{C_{10}}) = \frac{|\vec{\tau}_{\omega R}|}{2|\vec{\tau}|^2} \quad \text{(eq. 112)}$$

Since the rotation angle of $C_{10}$ is the only control parameter for SOnFO 208, and from (eq. 112), the solution of $C_{10}$ is continuous, that is, there is no issue of transient fluctuation when the settings of the second order PMD magnitude of SOnFO 208, $|\vec{\tau}_{\omega R}|$, are changed.

FIGS. 15 and 16 correspond to FIGS. 6 and 8B, except showing the details of the FOnSO and SOnFO modules of FIGS. 10 and 14.

In FIG. 15, showing a PMD compensator, control signal 203 serves to control PC 202 to produce rotation $R_{202}$ such that $$R_{204} \cdot R_{202} \cdot \vec{\tau}_f = -\vec{\tau}_{204} \quad \text{(eq. 113)}$$

where $\vec{\tau}_f$ is the measured first order PMD of the fiber, $\vec{\tau}_{204}$ is the first order PMD provided by FOnSO 204 and $R_{204}$ is the rotation matrix of FOnSO 204. Control signal 301 as given by (eq. 9) for first order PMD is tuned so that the parameter of phase-plates 315 and 335, $C_0$, is such that each of identical blocks 300 and 345 produces half of the designated DGD value. Control signal 326 as given by (eq. 12) is tuned so that the parameter of phase-plate 325, $C_1$, is such that the first order PMD vectors of the identical blocks 300 and 345 add to give the designated DGD value, while their second order PMD vectors cancel one another. Control signal 207 is set, in a feedback manner, by signal quality detector 212 to optimize the quality of the optical signal; the quality of the optical signal is represented by, e.g., its eye diagram. Control signal 376 as given by (eq. 112) for second order PMD is tuned so that the parameter of tunable phase-plates 365, 375 and 385, $C_{10}$, is such that each of blocks 350 and 395 produces half of the designated magnitude of second order PMD, and add to give the desired value of second order PMD while their first order PMD cancel.

In FIG. 16, showing a PMD generator, control signals 243, 302, 328, 247 and 378 are chosen to provide the desired PMD emulation.

For a totally feedforward PMD compensator, such as shown in FIG. 8A, the control signal for PC 246 is given by $$R_{248} \cdot R_{246} \cdot \vec{\tau}_{\omega f}' = -\vec{\tau}_{248}' \qquad \text{(eq. 114)}$$

where $\vec{\tau}_{\omega f}'$ is the second order PMD of the fiber transformed to the plane just before PC 246, $\vec{\tau}_{248}'$ is the second order PMD generated by SOnFO 248 and $R_{248}$ is the rotation matrix of 248.

In other embodiments, a PMD compensator or PMD generator uses only one of the FOnSO and SOnFO modules described herein, and uses a conventional arrangement to achieve the result of the other module.

The discussion above assumes all DGDs are identical. Identical DGDs are preferred to simplify calculations, but are not required.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An apparatus for compensating or generating polarization mode dispersion (PMD) for an optical fiber, comprising:
    means for separately controlling the magnitude of the first and second order PMD in a lightwave signal, the means for controlling the magnitude of the first order PMD including
        first means for producing a first portion of the desired first order PMD magnitude and a first determined amount of second order PMD,
        second means for producing a second portion of the desired first order PMD magnitude and a second determined amount of second order PMD, and
        first tuning means for adjusting a coupling of the first means and second means to produce the full amount of desired first order PMD magnitude and to produce no second order PMD, and
    means for controlling the direction of the first and second order PMD in the lightwave signal.

2. The apparatus of claim 1, wherein the means for controlling the direction of first and second order PMD includes means for aligning the produced first order PMD magnitude to cancel the first order PMD of the optical fiber.

3. The apparatus of claim 1, wherein the means for controlling the magnitude of the second order PMD comprises:
    third means for producing a first portion of the desired second order PMD magnitude and a first determined amount of first order PMD,
    fourth means for producing a second portion of the desired second order PMD magnitude and a second determined amount of first order PMD, and
    second tuning means for adjusting a coupling of the third means and fourth means to produce the full amount of desired second order PMD magnitude and to produce no first order PMD.

4. The apparatus of claim 3, wherein the means for controlling the direction of first and second order PMD includes means for aligning the produced second order PMD magnitude to cancel the second order PMD of the optical fiber.

5. A method for compensating or generating polarization mode dispersion (PMD) for an optical fiber, comprising:
    separately controlling the magnitude of the first and second order PMD in a lightwave signal, by
        providing a first means for producing a first portion of the desired first order PMD magnitude and a first determined amount of second order PMD,
        providing a second means for producing a second portion of the desired first order PMD magnitude and a second determined amount of second order PMD, and
        adjusting a coupling of the first means and second means to produce the full amount of desired first order PMD magnitude and to produce no second order PMD, and
    controlling the direction of the first and second order PMD in the lightwave signal.

6. The method of claim 5, wherein controlling the direction of first and second order PMD includes aligning the produced first order PMD magnitude to cancel the first order PMD of the optical fiber.

7. The method of claim 5, wherein controlling the magnitude of the second order PMD comprises:
    providing a first means for producing a first portion of the desired second order PMD magnitude and a first determined amount of first order PMD,
    providing a second means for producing a second portion of the desired second order PMD magnitude and a second determined amount of first order PMD, and
    adjusting a coupling of the first means and second means to produce the full amount of desired second order PMD magnitude and to produce no first order PMD.

8. The method of claim 7, wherein controlling the direction of first and second order PMD includes aligning the produced second order PMD magnitude to cancel the second order PMD of the optical fiber.

9. An apparatus for compensating polarization mode dispersion (PMD) in a lightwave signal, comprising:
    a first module for compensating first order PMD without affecting second order PMD, including
        first and second portions, each for producing second order PMD alterations that cancel each other, and
        a tuner for adjusting the coupling of the first and second portions so that each of the first and second portions produces half of the first order PMD alteration, and
    a second module for compensating second order PMD without affecting first order PMD, wherein the first and second modules are separately controlled.

10. The apparatus of claim 9, wherein the second module comprises
- first and second portions, each for producing first order PMD alterations that cancel each other, and
- a tuner for adjusting the coupling of the first and second portions so that each of the first and second portions produces half of the second order PMD alteration.

11. The apparatus of claim 9, wherein the first module is controlled in a feedforward manner and second module is controlled in a feedback manner.

12. The apparatus of claim 9, wherein the first and second modules are controlled in a feedforward manner.

13. An apparatus for generating polarization mode dispersion (PMD) in a lightwave signal, comprising:
- a first module for generating first order PMD without affecting second order PMD, including
  - first and second portions, each for producing second order PMD alterations that cancel each other, and
  - a tuner for adjusting the coupling of the first and second portions so that each of the first and second portions produces half of the first order PMD alteration, and
- a second module for generating second order PMD without affecting first order PMD, wherein the first and second modules are separately controlled.

14. The apparatus of claim 13, wherein the second module comprises
- first and second portions, each for producing first order PMD alterations that cancel each other, and
- a tuner for adjusting the coupling of the first and second portions so that each of the first and second portions produces half of the second order PMD alteration.

15. A module for altering first order polarization mode dispersion (PMD) without altering second order PMD in a lightwave signal, comprising:
- first and second portions, each for producing second order PMD alterations that cancel each other, and
- a tuner for adjusting the coupling of the first and second portions so that each of the first and second portions produces half of the first order PMD alteration.

16. The module of claim 15, wherein the lightwave signal contains PMD and the module is used to remove PMD.

17. The module of claim 15, wherein the lightwave signal is devoid of PMD and the module is used to generate PMD.

18. The module of claim 15, wherein the tuner is a phase-plate.

19. The module of claim 15, wherein each of the first and second portions includes two fixed differential group delay (DGD) segments and a tuner for coupling the two fixed DGD segments.

20. The module of claim 19, wherein each of the fixed DGD segments is a birefringent crystal.

21. The module of claim 19, wherein each of the fixed DGD segments is a polarization maintaining fiber.

22. The module of claim 19, wherein the fixed DGD segments in the first and second portions are substantially identical.

23. The module of claim 15, wherein the module is fabricated using MEMS technology on a wafer.

24. A module for altering second order polarization mode dispersion (PMD) without altering first order PMD in a lightwave signal, comprising:
- first and second portions, each for producing first order PMD alterations that cancel each other, each of the first and second portions including two fixed differential group delay (DGD) segments and a portion tuner for coupling the two fixed DGD segments, and
- a module tuner for adjusting the coupling of the first and second portions so that each of the first and second portions produces half of the second order PMD alteration,
- wherein the module tuner and each of the portion tuners are substantially identically tuned.

25. The module of claim 24, wherein the lightwave signal contains PMD and the module is used to remove PMD.

26. The module of claim 24, wherein the lightwave signal is devoid of PMD and the module is used to generate PMD.

27. The module of claim 24, wherein the tuner is a phase-plate.

28. The module of claim 24, wherein each of the fixed DGD segments is a birefringent crystal.

29. The module of claim 24, wherein each of the fixed DGD segments is a polarization maintaining fiber.

30. The module of claim 24, wherein the fixed DGD segments in the first and second portions are substantially identical.

31. The module of claim 24, wherein the module is fabricated using MEMS technology on a wafer.

32. A module for altering second order polarization mode dispersion (PMD) without altering first order PMD in a lightwave signal, comprising:
- first and second portions, each for producing first order PMD alterations that cancel each other,
- a module tuner for adjusting the coupling of the first and second portions so that each of the first and second portions produces half of the second order PMD alteration, and
- two fixed phase-plates for respectively coupling the first and second portions to the module tuner, the module tuner and two fixed phase-plates forming a polarization controller.

* * * * *